US011949972B2

(12) United States Patent
Meister et al.

(10) Patent No.: US 11,949,972 B2
(45) Date of Patent: Apr. 2, 2024

(54) IMAGE-CAPTURE SYSTEMS AND METHODS (71) Applicant: Five AI Limited, Bristol (GB)

(72) Inventors: Roland Meister, Cambridge (GB); Stan Boland, Cambridge (GB)

(73) Assignee: Five AI Limited, Cambridge (GB)

( * ) Notice: Subject to any disclaimer, the term of this patent is extended or adjusted under 35 U.S.C. 154(b) by 428 days.

(21) Appl. No.: 17/279,885

(22) PCT Filed: Sep. 27, 2019

(86) PCT No.: PCT/EP2019/076317
§ 371 (c)(1),
(2) Date: Mar. 25, 2021

(87) PCT Pub. No.: WO2020/065072
PCT Pub. Date: Apr. 2, 2020

(65) Prior Publication Data
US 2022/0038611 A1 Feb. 3, 2022

(30) Foreign Application Priority Data

Sep. 27, 2018 (GB) ...................................... 1815792
Nov. 1, 2018 (GB) ...................................... 1817895
Nov. 1, 2018 (GB) ...................................... 1817898

(51) Int. Cl.
*H04N 23/52* (2023.01)
*B60R 11/00* (2006.01)
(Continued)

(52) U.S. Cl.
CPC ............ *H04N 23/52* (2023.01); *B60R 11/04* (2013.01); *B60S 1/46* (2013.01); *B60S 1/56* (2013.01);
(Continued)

(58) Field of Classification Search
CPC . H04N 23/52; B60R 11/04; B60R 2011/0085; B60R 2011/0092; B60S 1/46; B60S 1/56; G02B 1/18; G02B 27/0006
See application file for complete search history.

(56) References Cited

U.S. PATENT DOCUMENTS

2019/0084526 A1\* 3/2019 Seubert ................... G06T 5/007
2020/0254979 A1\* 8/2020 Bretagnol .............. G03B 29/00

FOREIGN PATENT DOCUMENTS

DE 102008027430 A1 2/2009
DE 102013006686 A1 \* 10/2014 ............ B60S 1/0848
(Continued)

OTHER PUBLICATIONS

International Search Report and Written Opinion for International Application No. PCT/EP2019/076317 dated Jan. 8, 2020.
(Continued)

*Primary Examiner* — Timothy J Henn
(74) *Attorney, Agent, or Firm* — Andrew J. Tibbetts; Greenberg Traurig, LLP (57) ABSTRACT

An imaging system for an autonomous vehicle comprises a camera for capturing images within a first field of view, a transparent disc arranged in front of the camera such that the transparent disc covers the field of view of the camera, an actuator configured to rotate the transparent disc, and a mounting arrangement configured to mount the camera, the transparent disc and the actuator on an autonomous vehicle. Also described is an imaging system comprises a camera for capturing images within a first field of view through a transparent surface, and a fluid dispenser constructed and arranged to spray a fluid onto the transparent surface within the first field of view. Also described is an image capture system for an autonomous vehicle comprising two such cameras with respective transparent discs and actuators.

16 Claims, 9 Drawing Sheets (51) Int. Cl.
    *B60R 11/04*     (2006.01)
    *B60S 1/46*     (2006.01)
    *B60S 1/56*     (2006.01)
    *G02B 1/18*     (2015.01)
    *G02B 27/00*     (2006.01)

(52) U.S. Cl.
    CPC ........... *G02B 1/18* (2015.01); *G02B 27/0006* (2013.01); *B60R 2011/0085* (2013.01); *B60R 2011/0092* (2013.01)

(56) References Cited

FOREIGN PATENT DOCUMENTS

| | | |
|---|---|---|
| DE | 102015007794 A1 | 12/2015 |
| GB | 2488420 A | 8/2012 |
| WO | WO 2018/019662 A1 | 2/2018 |

OTHER PUBLICATIONS

Invitation to Pay Additional Fees for International Application No. PCT/EP2019/076317 mailed Nov. 5, 2019.
PCT/EP2019/076317, Jan. 8, 2020, International Search Report and Written Opinion.
PCT/EP2019/076317, Nov. 5, 2019, Invitation to Pay Additional Fees.

\* cited by examiner

IMAGE-CAPTURE SYSTEMS AND METHODS

RELATED APPLICATIONS

This application is a national stage filing under 35 U.S.C. § 371 of International Patent Application Serial No. PCT/EP2019/076317, filed Sep. 27, 2019, which claims priority to United Kingdom patent application number GB 1817898.8, filed Nov. 1, 2018; to United Kingdom patent application number GB 1817895.4, filed Nov. 1, 2018; and to United Kingdom patent application number 1815792.5, filed Sep. 27, 2018. Each of the foregoing applications is incorporated by reference herein in its entirety.

TECHNICAL FIELD

The present invention relates to image-capture systems.

BACKGROUND

An autonomous vehicle (AV), also known as a self-driving vehicle, refers to a vehicle which has a sensor system for monitoring its external environment and a control system that is capable of making and implementing driving decisions automatically using those sensors. This includes in particular the ability to automatically adapt the vehicle's speed and direction of travel based on inputs from the sensor system. A fully autonomous or "driverless" vehicle has sufficient decision making capability to operate without any input from a human driver. However the term autonomous vehicle as used herein also applies to semi-autonomous vehicles, which have more limited autonomous decision-making capability and therefore still require a degree of oversight from a human driver. For example, a vehicle fitted with advanced driver assistance (ADAS) features may be considered an "autonomous vehicle".

Sensor systems for autonomous vehicles use RADAR, LIDAR, and optical imaging systems which utilise optical sensors or cameras. The terms "optical sensor" and "camera" are used synonymously. Optical imaging systems for an autonomous vehicle may include multiple cameras for capturing images of the environment, e.g. the road ahead and behind the vehicle, lanes and pedestrian areas to the sides of the vehicle, other road users such as other vehicles, etc. in order to localize the vehicle within the environment and enable object detection to be performed. Accurate vehicle localization may be needed in various contexts, in both autonomous and conventional (manually-driven) vehicles.

SUMMARY

The present inventors set out to address the challenge of providing the best possible image obtained by on-car cameras to a processing and planning system of the vehicle. They established a number of different criteria to be met in a system for ensuring that camera lenses are kept as clean as possible in use of the AV. When an AV is travelling, in particular when an AV is traveling at significant speed, debris is deposited on camera lenses (in the same manner as it would be, for example, on the windscreen of a vehicle). This debris may include dust and insect splatter. Furthermore, in rainy conditions, surface rain drops, or a continuous film of rain, can impede image capture.

The criteria which were taken into account were the ability of the lens cleaning system to deal with light insect splatter and heavy insect splatter, as well as rain water. Other criteria were also taken into account, considering the complexity of the system, the likely reliability in use, likely service intervals, costs and aesthetic appearance when installed on a car.

The solutions defined herein were found to perform well against these criteria, when used singly or in combination. The combination of the two techniques was found to be particularly effective.

According to a first aspect disclosed herein, there is provided an image capture system for an autonomous vehicle, the imaging system comprising:
  a first camera for capturing images within a first field of view;
  a first transparent disc arranged in front of the first camera such that the first transparent disc covers the first field of view;
  a first actuator configured to rotate the first transparent disc;
  a second camera for capturing images within a second field of view;
  a second camera disc arranged in front of the second camera such that the second transparent disc covers the second field of view;
  a second actuator configured to rotate the second transparent disc;
  a mounting arrangement constructed and arranged to fix the first and second camera to capture images in the same plane of view; and
  an image processor configured to apply an image processing algorithm to images received from the first and second cameras.

In an example, the image processing algorithm is a computer stereo vision algorithm.

In an example, the image processing algorithm is an object detection algorithm.

In an example, the image processing algorithm is a scene understanding algorithm.

In an example, the imaging system comprises at least one actuator for rotating the first transparent disc.

A second actuator may be provided for rotating the second transparent disc.

In an example, the at least one actuator is controlled to rotate the first transparent disc in response to an accuracy level of the image processing algorithm falling below a threshold value.

In an example, the at least one actuator is controlled to rotate the first transparent disc in response to input from a sensor.

The sensor may be a precipitation sensor such as a rain or snow sensor.

In an example, the imaging system comprises at least one fluid dispenser for spraying a fluid onto the first transparent disc.

A second fluid dispenser may be provided for spraying a fluid onto the second transparent disc.

The fluid may be air. The fluid may be water.

In an example, the first and second transparent discs are coated with a hydrophobic or super-hydrophobic surface treatment.

According to a second aspect disclosed herein, there is provided an imaging system for an autonomous vehicle, the imaging system comprising:
  a camera for capturing images within a first field of view;
  a transparent disc arranged in front of the camera such that the transparent disc covers the field of view of the camera;
  an actuator configured to rotate the transparent disc; and a mounting arrangement configured to mount the camera, the transparent disc and the actuator on an autonomous vehicle.

In an example, the mounting arrangement can be configured to mount the camera facing a direction of interest for a driving task. For example, the mounting arrangement can be configured to mount the camera facing a direction of movement of the autonomous vehicle.

The images may be fed to an image processor on board or off board the vehicle configured to apply an image processing algorithm to the images.

In an example, the image processing algorithm is a computer stereo vision algorithm.

In an example, the image processing algorithm is an object detection algorithm.

In an example, the image processing algorithm is a scene understanding algorithm.

According to a third aspect disclosed herein, there is provided an imaging system comprising:
  a camera for capturing images within a first field of view through a transparent surface;
  a fluid dispenser constructed and arranged to spray a fluid onto the transparent surface within the first field of view.

The imaging system may be for an autonomous vehicle and may comprise a mounting arrangement for mounting the camera and fluid dispenser on the autonomous vehicle.

In an example, the transparent surface is a lens of the camera. In other example, the transparent surface is separate from the lens of the camera and located in front of the lens of the camera.

In an example, the imaging system may comprise a first fluid dispenser constructed and arranged to spray a first fluid onto the transparent surface within the first field of view and a second fluid dispenser constructed and arranged to spray a second fluid, different from the first fluid, onto the transparent surface within the first field of view.

In an example, the first fluid is air and the second fluid is water or a water-based cleaning solution.

In an example, the imaging system comprises a second camera for capturing images within a second field of view, wherein the images from the first and second camera are fed to an image processor on board or off board the vehicle configured to apply an image processing algorithm to the images.

In an example, the image processing algorithm is a computer stereo vision algorithm.

In an example, the image processing algorithm is an object detection algorithm.

In an example, the image processing algorithm is a scene understanding algorithm.

In an example, the second camera is configured to capture images through a second transparent surface; and the imaging system comprises: a second fluid dispenser constructed and arranged to spray a fluid onto the transparent surface within the second field of view; wherein the mounting arrangement is configured to mount the first and second camera and the first and second fluid dispenser on the autonomous vehicle.

The first and second fluids may be the same fluid. The first and second fluids may be different fluids.

DETAILED DESCRIPTION

A fully autonomous or "driverless" vehicle has sufficient decision making capability to operate without any input from a human driver. However the term autonomous vehicle as used herein also applies to semi-autonomous vehicles, which have more limited autonomous decision-making capability and therefore still require a degree of oversight from a human driver. For example, a vehicle fitted with advanced driver assistance (ADAS) features may be considered an "autonomous vehicle". Hence, it is understood that the following disclosure referring to an autonomous vehicle (AV) may also be applied to a semi-autonomous vehicle such as a vehicle with ADAS features.

Figure 1:
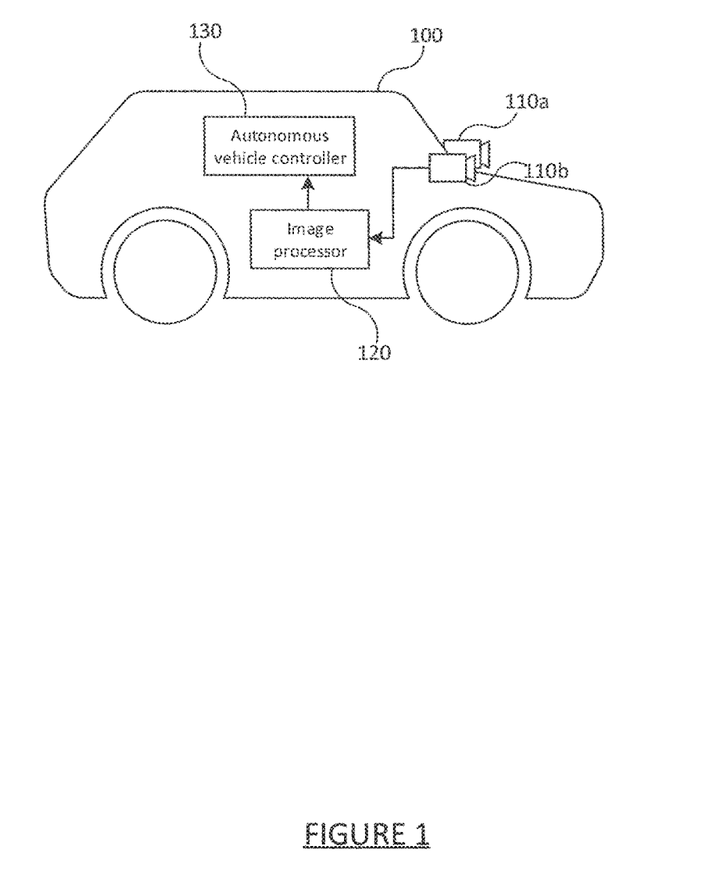
FIG. 1 shows a schematic block diagram of an autonomous vehicle

FIG. 1 shows a highly-schematic block diagram of an autonomous vehicle 100, which is shown to comprise an instance of an image processor 120, having an input connected to an image capture system of the vehicle 100 and an output connected to an autonomous vehicle controller 130. The vehicle 100 is a car in this example, but it can be any form of vehicle. The autonomous vehicle controller 130 is configured to autonomously (without any, or substantially without any input from a human user) by appropriately actuating control aspects of the vehicle 130 such as the steering, brakes, accelerator, etc. The operation of an autonomous vehicle controller 130 is not the subject of this disclosure—there are many controllers available in the art.

In order for the autonomous vehicle controller 130 to control the vehicle 100 appropriately and safely, it must assess the surroundings. This can involve identifying things like road markings, traffic signals, other vehicles, pedestrians, etc. To do so, the autonomous vehicle controller 130 receives input from sensors regarding the surroundings of the vehicle 100. One particularly important type of sensor in this regard are image capture systems such as that shown in FIG. 1. In this example, the image capture system comprises a left camera 110a, a right camera 110b, and an image processor 120. The left camera 110a is mounted on the left-hand side of the vehicle 100 and the right camera 110b is mounted on the right-hand side of the vehicle 100. To do so, a mounting arrangement (not shown in FIG. 1) is provided which holds the left camera 110a and right camera 110b in the same plane of view. There may be more cameras mounted at different positions on the vehicle 100 providing additional information regarding the surroundings.

In accordance with embodiments of the present invention, the left camera 110a and the right camera 110b are installed at different locations on the autonomous vehicle and thereby capture images of the environment from different viewpoints. As mentioned above, the left camera 110a and right camera 110b are arranged to capture images from the same plane of view. Hence, by comparing images from each camera, the image processor 120 can determine depth information using computer stereo vision techniques, as known in the art.

In other examples, there may be a single camera 110 installed on the autonomous vehicle 100. Images from a single camera 110 (and also from multiple cameras) may be analysed by the image processor 120 using object detection techniques known in the art to detect both dynamic objects (e.g. cars, bikes, pedestrians, etc.) and static objects (e.g. signs, road furniture, traffic lights, etc.). Other techniques such as scene understanding algorithms may be applied to images captured by the camera or cameras.

Whatever the setup, and whatever image processing algorithm(s) are applied to the images from the camera or cameras, it is important that the results of such algorithms are accurate. This means that the images need to be as clear as possible (or at least sufficiently clear to derive reliable outputs).

For example, in order for the image processor 120 of the autonomous vehicle 100 to accurately determine depth information from images captured by two cameras, it is important that the images from each camera are in a state to be compared. That is, differences between the images arise from the different viewpoints of the cameras and not, e.g. distortion in one or more of the images. The cameras need to be maintained in fixed positions, resistant to vibrations etc. Similar considerations to the above apply in relation to other types of image processing algorithm, whether applied to a single image or to multiple images.

The present invention recognises that one reason that the image processor 120 may not be able to accurately process the images is because there is debris such as water, ice, insects, dirt, bug residue, tree sap, etc. on the camera lens.

Autonomous vehicles developed so far have been designed to travel around in conditions where, generally, the weather is normally benign. Moreover, roads and junctions are well defined with limited variations. A challenge is to enable the autonomous vehicle to function in any climate or location, no matter the weather condition or maintenance condition of the transport infrastructure. For example, autonomous vehicles should be able to deal with bad weather (e.g. lots of rain), poor roads, debris, complex junctions, ill-defined road markings, etc. All of these can make vehicle localization more difficult. Some of these factors (such as ill-defined road markings) may make it more difficult for the autonomous vehicle controller 130 to localize the vehicle 100 because the features which need to be identified in the surroundings (e.g. road markings) are more difficult to identify in captured images. Other factors (such as rain) may affect the captured images directly. As a specific example, an autonomous vehicle maneuvering in an urban area in Europe may find itself navigating a complex junction with debris and poor road markings in bad weather conditions. In any case, it is important that the captured images are as clear as possible to improve the accuracy of the analysis performed by the image processor 120.

The above-mentioned problems can be particularly noticeable with forward-facing cameras (facing the intended direction of travel of the autonomous vehicle 100) because these cameras tend to accumulate material incident on the lens. For example, rain or other precipitation can land on the lenses of the cameras 110a, 110b. Even in dry weather conditions, these cameras 110a, 110b can accumulate dirt such as dust or insects which become stuck on the lenses of the camera. Similar issues can occur with non-forward-facing cameras. In general, the camera(s) may be mounted on the vehicle facing any direction of interest for the driving task where object detection is important (i.e. anywhere in the 360 degrees available relative to the vehicle).

Figure 2:
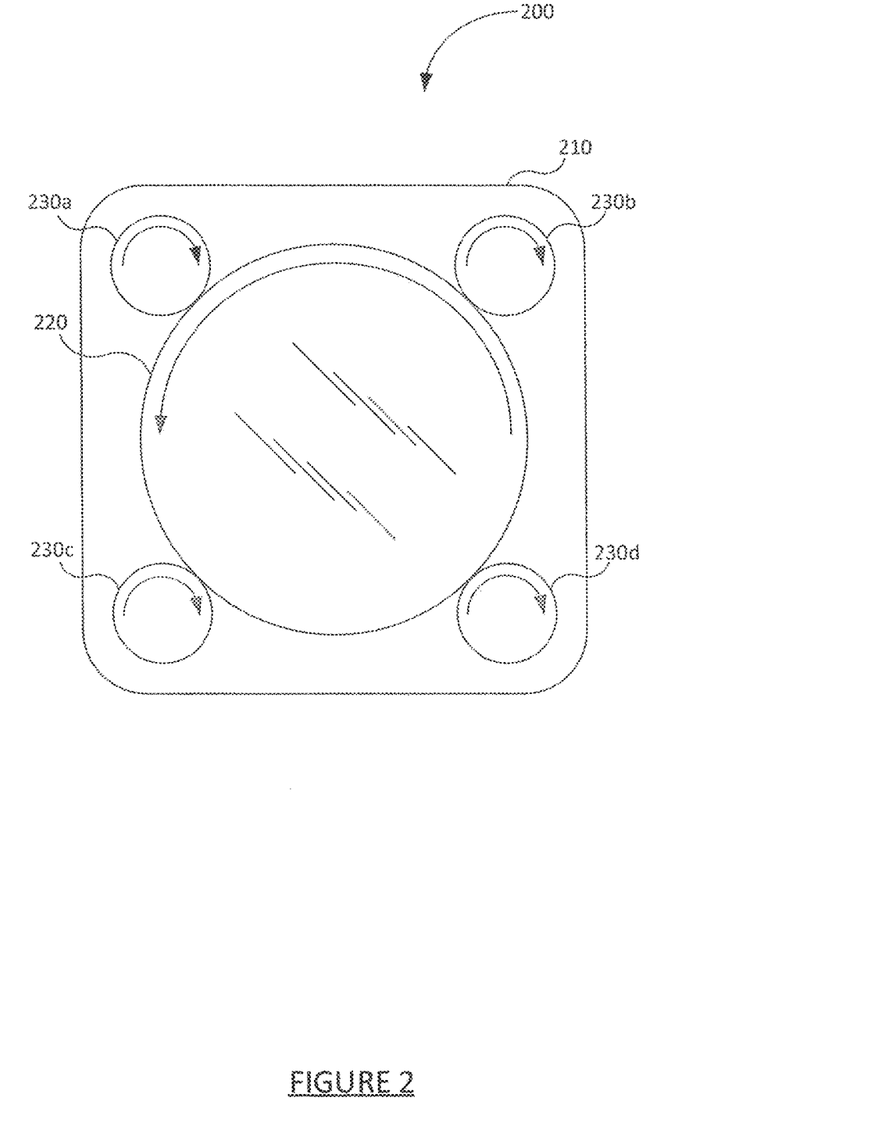
FIG. 2 shows schematically a deflector in accordance with examples described herein.

The present invention addresses the above-identified problem by providing a deflector 200 in front of the lens of each camera 110a, 110b which comprises a transparent disc 220 that can be spun to clear e.g. water, dirt, insects, etc. using centrifugal force. An example of this is illustrated in FIG. 2. The transparent circular disc 220 is arranged parallel to the lens of the respective camera 110a, 110b. Similarly, the transparent circular disc 220 is configured to rotate within a plane which is parallel to the plane of the lens of the respective camera 110a, 110b. In this example, the disc 220 is circular but in other examples the disc 220 may be a different shape e.g. a square or a Reuleaux triangle.

The disc 220 is located in front of the camera lens and held in place by housing 210. The disc 220 and housing 210 together prevent dirt and/or moisture from reaching the camera lens. Hence, in operation, moisture and/or dirt will build up on the rotatable disc 220, not the camera lens itself. Preferably the housing doesn't extend outwards at the edge of the disc, because water or dirt can become trapped on the edge due to the centrifugal force. Instead, the housing should be constructed such that material on the disc 220 is able to completely leave the surface of the disc 220 under centrifugal force caused by the rotation.

It is understood that only a single deflector 200 is shown in FIG. 2, but that in reality there may be a deflector 200 installed for each camera 110a, 110b on the vehicle 100 for which material build-up is a problem. An example of this is described later in relation to FIG. 3. In another arrangement, a single deflector 200 may be provided for plural cameras 110. More than one type of arrangement may be installed on the autonomous vehicle 100.

When material such as dirt and/or moisture does build up on the transparent disc 220, an actuator (not shown) is controlled by a controller on the autonomous vehicle to spin the disc 220. In the example shown in FIG. 2, there are four drivers 230a-d which act to both hold the disc 220 in place and to rotate the disc 220. That is, the disc 220 itself is held in place by contacting the four drivers 230a-d and rotates in counter-motion to the drivers 230a-d as indicated by the arrows in FIG. 2. For example, the drivers 230a-d and/or main disc 220 may have a high-friction edge made of e.g. rubber which is arranged to transfer torque between the drivers 230a-d and the main disc 220. Alternatively, the drivers 230a-d may be geared drivers which engage a toothed rim of the main disc 220. To rotate the disc 220, at least one of the drivers 230a-d is controlled to rotate (e.g. by an electric motor, not shown in FIG. 2), which causes the disc 220 to rotate. Greater or fewer drivers 230a-d may be used than the four shown in the illustrative example of FIG. 2.

It is understood that the rotating motion of the disc 220 will cause material present on the disc 220 to experience a centrifugal force due to the acceleration resulting from the rotating motion. The centrifugal force experienced by material at a particular point on the disc depends on both the rotational frequency of the disc 220 and the radial location of the material from the centre of the disc 220.

Preferably the disc 220 is spun fast enough to clear the dirt and/or moisture completely, resulting in a clear image from that camera. As mentioned above, this is important as it allows for accurate computer stereo vision calculations in determining depth information of objects in view of the cameras 110a, 110b. The disc 220 may be controlled, in operation, to rotate with a rotational frequency of 60 rpm or greater (i.e. once or more per second). In an example, the disc 220 is controlled to rotate at 900 rpm or more, which is particularly advantageous as this exceeds the typical "refresh rate" of human vision (around 15 Hz). In another example, the disc 220 is controlled to rotate at a rotational frequency which is greater than an image capture rate of the camera 110a, 110b to which it is mounted.

The higher the rotational speed, the better the cleaning effect (due to the greater resulting centrifugal force). In practice, the disc 220 may be spun at 1000 rpm or more. However, higher speeds require higher-quality gearing mechanisms which can be move expensive. Instead, extra cleaning mechanisms could be provided, examples of which are discussed below. In any case, the gearing mechanism should be able to operate in the present of dirt and moisture. The gearing mechanism should also be able to operate in normal vehicle operating temperatures (e.g. −20 to +50 degrees Celsius).

Suitable materials for the disc are sufficiently transparent so as not to hinder the image processing performed by the autonomous vehicle 100 and sufficiently strong to withstand the centrifugal force of being spun. Examples include glass, Perspex, plastic etc.

The disc may be coated to minimise dirt and/or moisture build-up. For example, the disc may be coated with a hydrophobic or super-hydrophobic coating. In other examples, the disc may be coated with a hydrophilic coating such as titanium dioxide. A thin layer of titanium oxide (e.g. 10-25 nm thick) can prevent water on the disc from forming droplets and instead spread out evenly across the glass.

Figure 3:
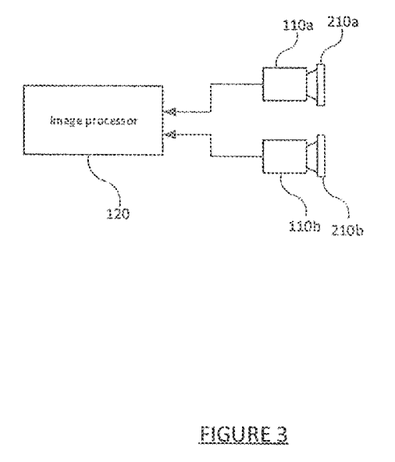
FIG. 3 shows schematically an image processing system in accordance with examples described herein.

FIG. 3 shows the first camera 110a and second camera 110b each installed with a respective deflector housing 210. A first deflector housing 210a is provided in front of the first camera 110a and a second deflector housing 210b is provided in front of the second camera 110b. Each deflector is constructed and operates in the same manner as described above in relation to FIG. 2.

As it is important that the cameras 110a, 110b capture images which are suitable to be compared for the purposes of stereoscopic imaging, the discs 220 of the deflectors 210a, 210b provided in front of each camera 110a, 110b should have corresponding optical properties. For example, the discs should preferably be flat and have the same thickness. This way, each disc will refract light in the same way, ensuring that differences in the captured images result from the fact that the cameras 110a, 110b have different viewpoints and not from discrepancies between the way light enters the lens of each camera 110a, 110b.

The disc may be arranged concentrically with the lens of the camera with respect to which it is mounted. To do so, the disc 220 may be mounted and rotated via drivers 230 on the circumference of the disc 220, as in the example of FIG. 2. This avoids the problem of a central axle which would be visible in images captured by the respective camera 110a, 110b.

The inventors have found that in such an arrangement a rotation rate of 3000 rpm is suitable for clearing the majority of a 120 mm diameter disc of water, dirt etc.

Figure 4A:
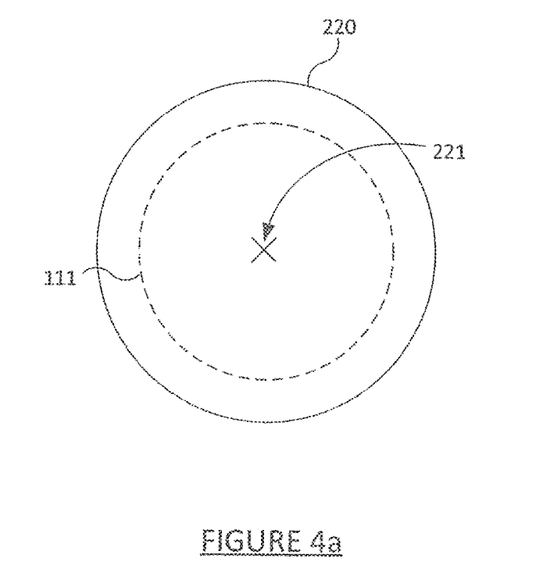
FIGS. 4a and 4b illustrate two example arrangements of a transparent disc with respect to a camera lens.

FIG. 4a illustrates such a concentric arrangement of the disc 220 with the camera lens 111. The camera lens 111 is in FIG. 4a is located behind the transparent disc 220, as indicated by the dashed lines. The centre of rotation 221 of the disc 220 is in the geometric centre of the (circular) disc 220. Thus, in this arrangement, the centre of rotation 221 is aligned with the geometric centre of the camera lens 111.

A concentric arrangement of the disc 220 can save space because the disc 220 need only be as large as the field of view of the camera 110 itself. However, in such an arrangement, dirt etc. located near the centre of the disc 220 will be subject to less centrifugal force than that located near the edge of the disc 220 (when rotating). Hence, it may be difficult to completely clear the disc 220 by simply spinning it.

Figure 4B:
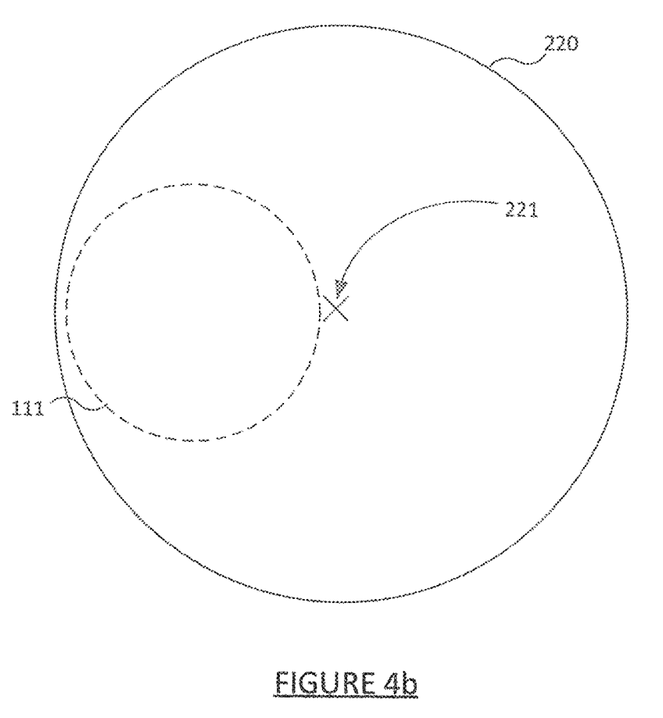

Alternatively, the disc 220 may be arranged asymmetrically, off-centre from the camera lens. For example, by having an axis of rotation outside of the field of view of the camera 110. An example of this is shown in FIG. 4b. The centre of rotation 221 is located to the side of the lens 111 of the camera. In such an arrangement, the disc 220 needs to be bigger in order to still cover the field of view. However, the above-mentioned potential build-up of dirt in the middle of the disc 220 is not an issue because the axis of rotation 221 is not within the field of view of the camera 110 and therefore does not impact on captured images.

In some examples a single rotating disc 220 may provided which covers the field of view of two or more cameras. The asymmetric arrangement illustrated in FIG. 4b is particularly suited to this.

In another possible arrangement, the disc 220 may be configured to rotate eccentrically (i.e. not about a fixed axis). Such an arrangement can help to clear material from the disc 220, especially the centre region, due to a non-constant centrifugal force. An example arrangement comprises a Reuleaux triangle shaped disc 220 arranged to rotate within a square mount 210. Other shapes of constant width may also be used.

As mentioned above, it may not be possible to completely clear the disc 220 by simply rotating it. This is particularly a problem with the concentric arrangement described above, but may also be the case with an asymmetric arrangement. Hence, one or more extra cleaning mechanisms may be provided.

Figure 5:
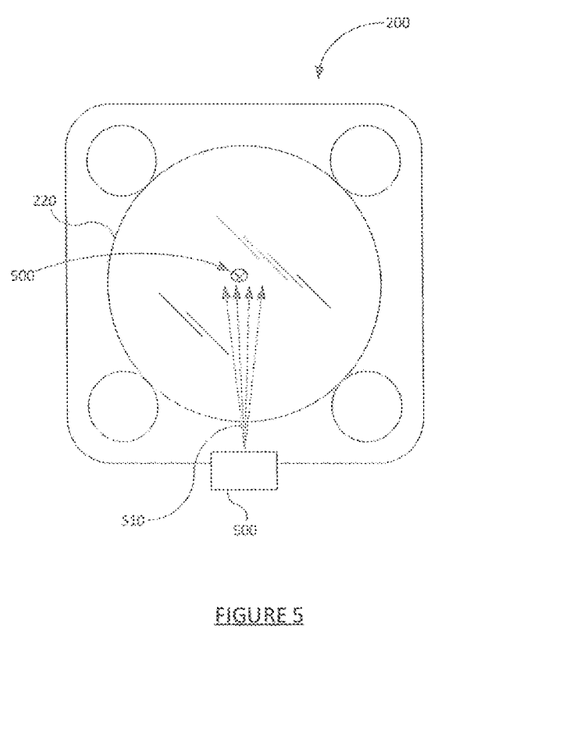
FIG. 5 shows schematically a deflector having a fluid dispenser in accordance with examples described herein.

FIG. 5 illustrates an example in which the deflector 200 comprises a fluid dispenser 500. The fluid dispenser is an example of an extra cleaning mechanism. The fluid dispenser 500 is constructed and arranged to spray a fluid onto the disc 220. FIG. 5 shows a fluid jet 210 provided by the fluid dispenser 500 which is incident on the centre region of the disc 220. Material 500 present on the disc 220 such as dirt or rain droplets that will not be subject to centrifugal force when the disc rotates can by cleaned using the fluid jet 210. Preferably the fluid dispenser 500 is arranged to spray the fluid onto the centre of the disc 220 because this is the region of the disc 220 most difficult to clear using rotation (as mentioned above). However, the fluid jet 510 from the dispenser 500 may be used to clean any region of the disc 220.

Examples of suitable fluids include air and water (though other liquids may be used). Air has the advantage of not requiring a storage tank, as the ambient air can be collected and pressurized. The inventors have found that water is particularly good for cleaning solid matter such as insects from the disc 220.

The fluid may be heated in order to increase its cleaning effect.

The fluid dispenser 500 may be configured to use more than one type of fluid. For example, the fluid dispenser 500 may be able to generate jets of water and jets of air. In such cases, the fluid dispenser 500 may be configured to use a second type of fluid in response to a supply of the first fluid being empty or below a threshold amount. For example, water might be used preferentially, with air being used as a backup.

In some examples, a deflector 200 may comprise two or more fluid dispensers 500. In such cases, the fluid dispensers may be configured to dispense different respective fluids. In a specific example, a deflector 200 may comprise a first fluid dispenser for dispensing air and a second fluid dispenser for dispensing water or a water-based cleaning fluid.

Preferably, the fluid dispenser 500 uses the least fluid possible while still achieving 100 (or near-100%) cleaning of the disc 220. This is a particular issue when the fluid is water because water must be stored in a container and there is therefore a finite supply. However, this is also an issue with air because, although ambient air can be used, it must first be compressed. This means that the less air is used to clean the disc 220, the less energy is wasted.

A balance is struck between on the one hand effective clearing and on the other hand minimizing the volume of fluid required over time. That is, the volume of fluid per burst where bursts of cleaning fluid are applied over time. With air/gas as the cleaning fluid in particular, it may be desirable in some circumstances to implement the technology without the user of an air compressor on the vehicle (using compressed air canisters instead), or with a light-weight, low-power air compressor. In both circumstances, it is desirable to reduce the volume of cleaning fluid used in each burst to the minimum possible whilst still achieving effective cleaning.

To achieve this, characteristics of the fluid jet 210 such as duration, flow pattern, angle to disc 220, volume of fluid used, and velocity of fluid may be controlled. These characteristics may be controlled through software or hardware (i.e. through the mechanical design of the fluid dispenser 500). The inventors have found that, for an air jet, a particularly effective jet has a velocity of 32 litres/min and a duration of 40 ms. This corresponds to 1.3 ml of air being used in the jet 510.

In some examples, the fluid dispenser 500 may be operated when the disc 220 is stationary. This may be the case because the disc 220 is not currently being operated to rotate, or because the disc 220 is unable to rotate due to e.g. a fault.

In testing, it was observed that when the disc 220 is coated as mentioned above (e.g. with a hydrophobic or hydrophilic coating), liquid cleared very quickly from the centre of the disc 220 but proved more difficult to clear from the rim (edge) of the disc 220. Therefore, it may be preferable when the disc 220 is so-coated to provide an actuator for moving the fluid dispenser 500 such that the jet 520 is directed towards the rim of the disc 220. The fluid cleaning technology disclosed herein has been found to be effective even without the use of a spinning disc, and hence can also be applied with a non-rotating disc/surface (which may be fixed by design). It will thus be appreciated that all description pertaining to the present fluid cleaning mechanisms in the context of a spinning disc applies equally in other contexts without spinning discs, surfaces, etc.

Figure 6:
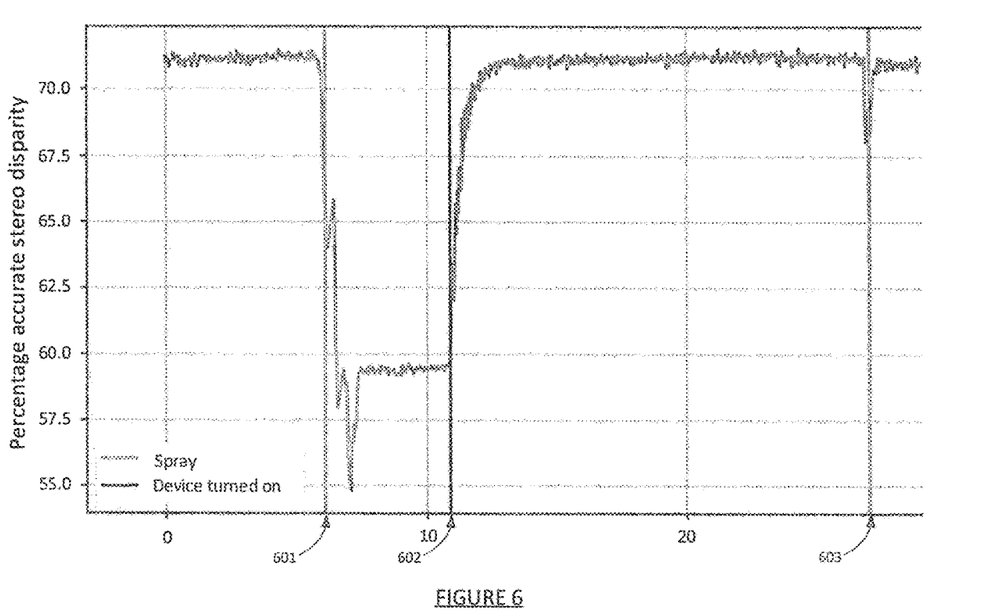
FIG. 6 shows a graph illustrating the effects of a spray on percentage accurate stereo disparity.

FIG. 6 is a graph illustrating the effect on the percentage accurate stereo disparity experienced at the image processor 120 by water applied to the disc 220 both when the disc 220 is not rotating and when the disc 220 is rotating. The percentage accurate stereo disparity is a measure of how well the image processor 120 is able to apply the computer stereo vision algorithm to identify depth information from images captured by the cameras 110a, 110b. Other measures may be used.

Before 601, the transparent disc 220 is clean, but not rotating. At 601, a water blast ("spray") is applied to the disc 220 to simulate rain (or some other impact of water onto the disc 220). This causes a dip in accuracy because the water remains on the disc 220 and interferes with the images captured by the camera 110a, 110b. Note that this spray is not provided by the fluid dispenser 500. Rather, the spray used here to simulate rain may be provided by another mechanism just as a hand-held spray bottle. Such a mechanism may deliver a fine mist onto the disc 220, resulting in the observed drop in accuracy (due to water collecting on the disc 220). This is in contrast to the high-velocity fluid jet 510 provided by the fluid dispenser 500 described above, which is arranged to clear the disc 220.

At 602, the deflector 200 is turned on (i.e. the disc 220 begins spinning, as controlled by the support discs 230 or other mechanism as described above). The rotating of the disc 220 causes the water applied at 601 to experience a centrifugal force and hence be removed from the surface of the disc 220. As the disc 220 dries, the percentage accurate stereo disparity returns back to the pre-spray (before 601) level.

At 603, a second spray of water is applied to the disc 220. This may be via a spray bottle as before, or may be via the fluid dispenser 500. Because the disc 220 is spinning, water does not settle on the disc 220 as before (at 601, described above). As can be seen in FIG. 6, when the disc 220 is spinning, water incident on the disc 220 causes only a brief and minor drop in the percentage accurate stereo disparity as compared with the dip experienced when the disc 220 is not spinning. A similarly large dip in accuracy would be experienced without the deflector 200 because the water would be incident on the lens of the camera 110a, 110b directly.

Wipers (not shown) may also be provided in order to clean the disc 220. Wipers have the advantage of providing a mechanical force which is particularly effective at cleaning stubborn material from the disc 220. However, while in use, the wipers will show up in images captured by the cameras 110. Because the camera 110 is placed close to the disc 220, the wipers will occupy a significant portion of the captured image, which can interfere with the image processing.

Operating the deflector 200 to rotate the disc 220 requires energy from an on-board power supply of the autonomous vehicle 100 such as an internal battery. One reason, therefore, for not wanting to run the deflector 200 all the time is because it will drain the power supply. Another reason is that operating the support discs 230 (or other driving mechanism) for long periods of time can cause the deflector 200 to heat up which may cause a hardware failure.

To address the issues mentioned above, the autonomous vehicle controller 130 may be configured to determine when to turn the deflector 200 of each camera 110 on and off, as described below. In other examples, the autonomous vehicle controller 130 may be configured to determine a speed at which to rotate the disc 220 of each camera 110. In either case, the autonomous vehicle control 130 is also configured to control the deflectors 200 of each camera 110 by sending control signals to the deflectors 200 causing the support discs 230 (or other driving mechanism) to rotate the respective disc 220.

The autonomous vehicle controller 130 may be configured to turn on the deflectors 200 in response to a problem with the image processing performed by the image processor 120. For example, the image processor 120 may provide a metric to the autonomous vehicle controller 130 indicating an accuracy of the computer stereo vision algorithm. An example of this is the percentage accurate stereo disparity falling mentioned above in relation to FIG. 6. A drop in the accuracy could be an indication that the images captured by the cameras 110 are not clear enough. Hence, the autonomous vehicle controller 130 may be configured to operate the deflectors 200 in response to the accuracy falling below a threshold value. As a specific example, the autonomous vehicle controller 130 may turn on the deflectors 220 of the two (or more) from-facing cameras 110a, 110b in response to the percentage accurate stereo disparity falling below 70%.

Alternatively or additionally, the autonomous vehicle controller 130 may determine to turn on one or more of the deflectors 200 based on input from one or more sensors. An example of a suitable sensor is a precipitation detector. The autonomous vehicle control 130 may receive input from the precipitation detector indicating that it is precipitating (e.g. raining or snowing) and turn the deflectors 200 on in response thereto. This is advantageous because the deflectors 200 can be turned on pre-emptively before a drop in image processing accuracy actually occurs (before precipitation such as rain or snow settles on the disc 200 and impacts on the captured images). In simple examples such as the ones described above, the autonomous vehicle controller 130 may only control the deflectors to turn on or off. In other examples, the autonomous vehicle controller 130 may control the rotation speed of the discs 220. In such cases, the autonomous vehicle controller 130 may control the deflectors 220 to begin rotating slowly and to increase the rotation speed until the image is cleared. Whether or not the image is clear can be determined explicitly via an indication from the image processor 120, or implicitly from an accuracy level of the computer stereo vision algorithm, as mentioned above.

In another example, the autonomous vehicle controller 130 may be configured to control the rotation speed of the disc 220 based on the travelling speed of the autonomous vehicle 100. For example, the autonomous vehicle controller 130 may increase the rotation rate of the disc 220 when the travelling speed of the autonomous vehicle 100 increases. This is advantageous because the faster the autonomous vehicle 100 is travelling, the more likely it is that material (e.g. insects) will impact on the disc 220 and need clearing.

If the accuracy level remains below a desired level even once after the deflectors 220 have been operated, this can be an indication that material is still present on one or more of the discs 220 which has not been removed via centrifugal force. Therefore, the autonomous vehicle controller 130 may operate a further cleaning mechanism such as fluid dispenser 500 or wipers (as described above) if the accuracy remains below a threshold level once the deflectors 200 have bene operated.

As mentioned above, the fluid dispenser 500 may be operated while the disc 220 is stationary. In yet further examples, the fluid dispenser 500 may be operated to clean the lens of the camera 110 itself or a non-rotatable transparent surface located in front of the lens of the camera 110. Air is a particularly effective choice of fluid for use on a non-rotating surface. This is because, unlike water, air does not collect in droplets on the surface. The inventors have found that air is particularly effective at cleaning a non-rotating surface if the surface is treated with a hydrophobic or super-hydrophobic treatment.

Figure 7:
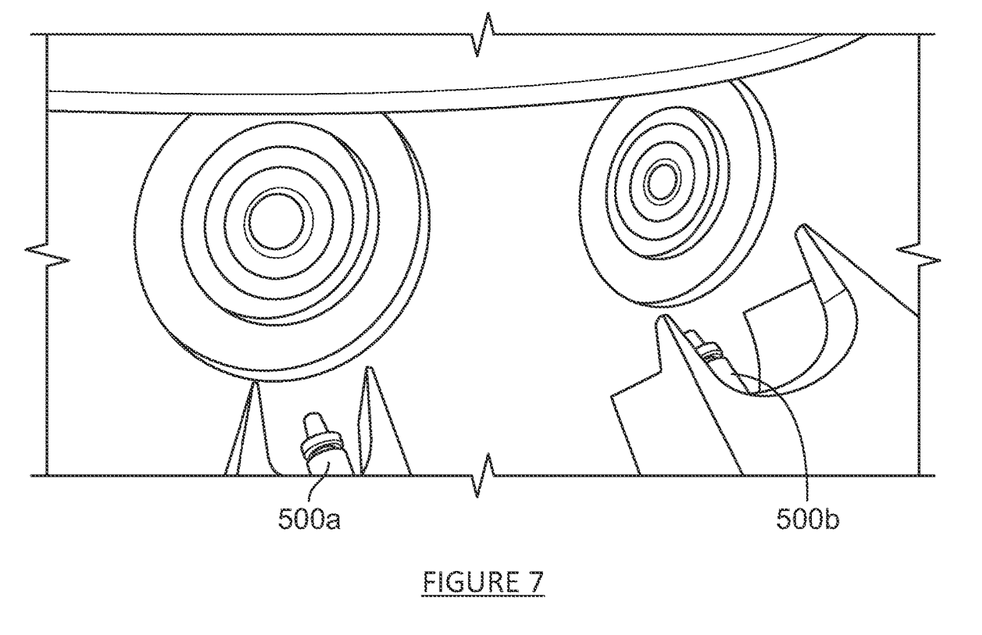
FIG. 7 shows an example arrangement of two fluid dispensers.

FIG. 7 shows an example arrangement in which a first fluid dispenser 500a and second fluid dispenser 500b are configured to apply respective fluid jets to respective cameras.

The fluid dispensers 500a, 500b should not interfere with the images captured by the cameras, but still be able to provide a jet of fluid suitable for cleaning the disc. Hence, each fluid dispenser 500a, 500b is located out of the field of view of its respective camera and positioned such that it produces a jet of fluid which is incident on the disc of the respective camera, as shown in FIG. 7.

Figure 8:
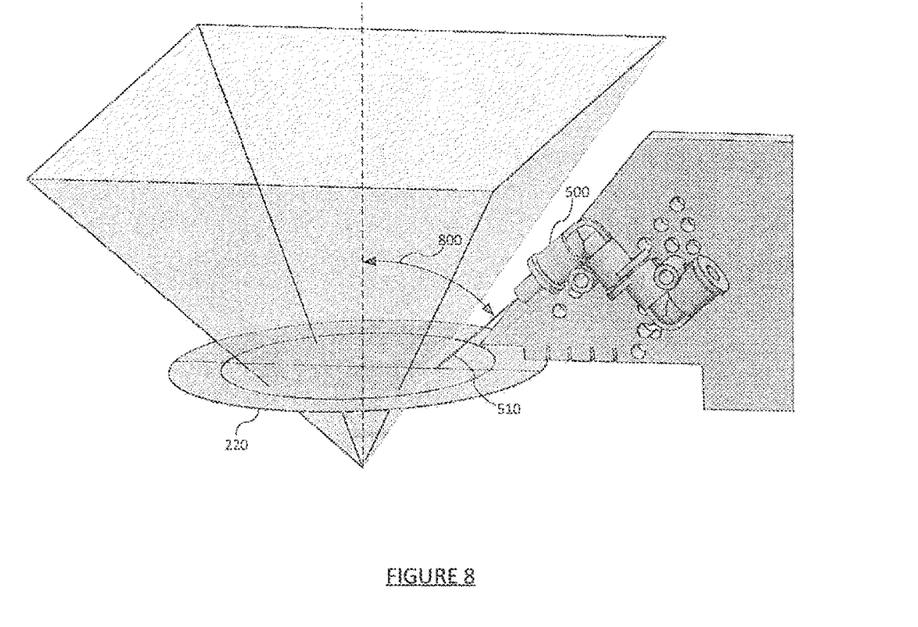
FIG. 8 shows a fluid dispenser arranged relative to a disc.

FIG. 8 shows a fluid dispenser 500 arranged to generate a fluid jet 510 incident on the disc 220 at an angle 800, the angle 800 being shown relative to the optical axis of the camera. In cases where the disc 220 is arranged concentrically with the camera lens, the optical axis of the camera corresponds to the normal at the centre of the disc 220.

Figure 9:
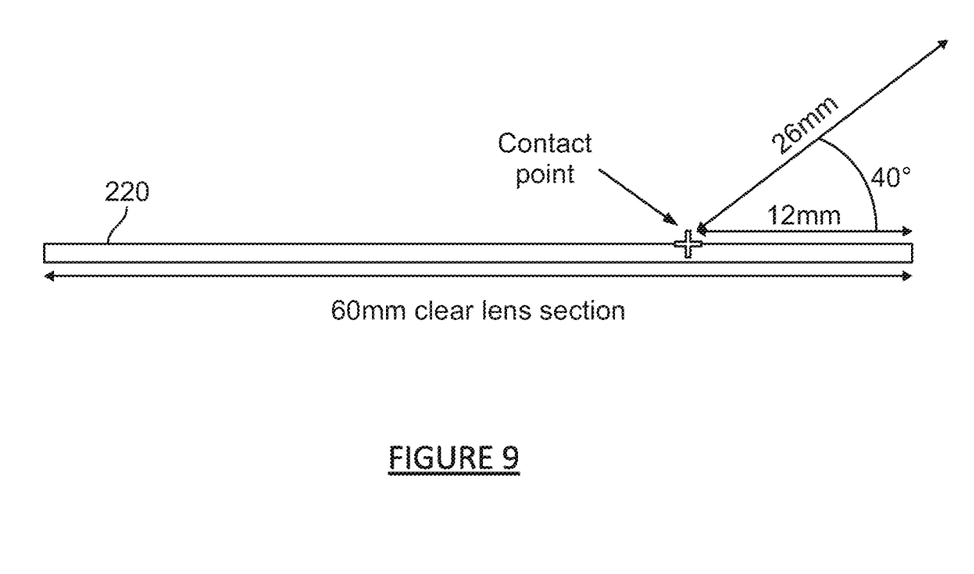
FIG. 9 shows an example angle of incidence of a fluid jet to a surface.

Following on, FIG. 9 shows a specific example arrangement in which the jet is incident at an angle of 40 degrees from the surface of the disc 220, i.e. 50 degrees from the normal. An angle of 40 degrees from the surface has been found to provide a sufficient cleaning effect within the camera's field of vision, although it will be appreciated that it is highly dependent on the geometry of the system. It is expected that angle of between 25 and 55 degrees generally will be appropriate in practice. In this example, the disc has a diameter of 60 mm. The jet is incident at a contact point located 12 mm from the edge of the disc 220. The fluid dispenser is located 26 mm from the contact point. This distance ensures that the fluid dispenser is not in the field of view of the camera.

Initial testing was performed to determine a flow rate of jet 510 which is suitable for cleaning the disc 220. Air was used as the fluid to remove water from the surface of the disc 220.

A flow rate of 2.1 litres/second was tested and determined to be capable of removing water from the surface of the disc 220. What flow rate is suitable for removing water or other liquids and/or dirt from the disc 220 will depend on factors such as the specific geometry of the fluid dispenser 500, the disc 220, their relationship and positioning relative to one another, whether or not the disc 220 is coated and what type of coating, etc. In this context, "suitable" means that the jet 510 is capable of clearing the disc 220 sufficiently that the images captured by the camera are clear enough to reliably be used by the image processing algorithm.

Fluid may be provided from an on-board tank or through an air or liquid pressurising system. Fluid from the on-board tank or air or liquid pressurising system can then be provided to the fluid dispensers 500 via piping. Activation of the jet 510 may be controlled via a controllable actuator, e.g. a solenoid. That is, a solenoid or other actuator can be constructed and arranged to open and close an opening (nozzle) through which the fluid flows to create the jet 510. The solenoid or other actuator is operatively coupled to the autonomous vehicle controller 130.

The amount of activations ("bursts") of the jet 510 which are available depends on factors such as the flow rate, the duration of the jet 510, and the size of the tank providing the fluid, etc. At a 2.1 litre/second flow rate, with a 0.25 second duration from a 12 litre tank, and a 5 bar minimum pressure, the jet 510 can be activated 114 times before the tank is depleted. In order to allow more activations of the jet 510, a lower flow rate could be used.

For example, to achieve 1000 activations of the jet 510 before depletion of a 20 litre tank, the jet 510 can have a 0.1 second duration jet 510 and a 1 litre/second flow rate.

The following is an example of how the number of activations available can be derived.

Equation 1 is a form of the ideal gas law for constant temperature where P is the pressure (N/m^2), V is the volume (m^3, n is the number of Moles, R is the Gas Constant (8.314 J), and T is the temperature (293K).

$$n=PV/RT$$ Equation 1

For a given tank pressure P and size V, the number of moles present in the tank can be determined using equation 1. For example, with a tank pressure of 1,000,000 N/m^2 and tank size of 0.012 m^3, approximately 4.92610433 moles will be present in the tank. Similarly, with a tank pressure of 500,000 N/m^2 and tank size of 0.012 m^3, approximately 2.463052 moles will be present in the tank.

The volume of air taken up by the calculated number of moles can be determined using a re-arrangement of Equation 1 with P set to atmospheric pressure (outside the tank). This represents the total amount of air available to use in the fluid jet. Each activation of the fluid jet will use a portion of this volume of available air, as described below.

For a given flow rate and flow duration, the volume of air (or other fluid) can be calculated as the product of flow rate and flow duration. For example, at a flow rate of 2.1 litres/second and a flow duration of 0.25 seconds, 0.525 litres of air will be used per activation. From this, and the total volume of air available calculated as above, the upper bound on the number of possible activations before depletion of the tank can be calculated by dividing the total volume of air available by the volume of air used per activation.

To achieve sufficiently effective cleaning with a low flow rate, the outlet diameter of the fluid dispenser 500 (the "nozzle size") can be optimized. Further testing was performed to determine a suitable outlet diameter when air is the fluid.

Five outlet diameters were tested: 0.4 mm, 0.7 mm, 1.0 mm, 1.3 mm, and 1.5 mm. A pressure of 5 bar was used. The results are and summarised below in Table 1 (note that the 1.5 mm test is not shown).

TABLE 1

| | Outlet diameter (mm) | | | |
|---|---|---|---|---|
| | 0.4 | 0.7 | 1.0 | 1.3 |
| Flow rate (lpm) | 6.5 | 13 | 22 | 33 |
| Flow duration (seconds) | 5 | 0.8 | 0.35 | 0.2 |
| # of activations available | 166 | 519 | 701 | 818 |

A summary of the observed results is given below.

0.4 mm and 0.7 mm: do not provide a strong enough jet to remove water without moving the nozzle around the surface of the disc 220.

1.0 mm: on average removes 80% of droplets but would need a blast duration of at least 0.5 seconds.

1.3 mm: on average 90% of droplets removed using a short blast.

1.5 mm: very good results, 95% of droplets removed with a very short blast.

Overall, testing suggested that larger flow rates for a shorter amount of time work much better. That is, a short fast blast of air is better than a long slow blast of air. A similar result holds for other fluids such as water. If the flow rate is too low (e.g. with the 0.4 mm outlet diameter), the fluid dispenser may need moving around the surface to clear the liquid.

Different shapes for the nozzle of the fluid dispenser 500 were also tested. A round nozzle and a duck-bill shaped nozzle were found to perform with similar cleaning properties. A cross-shaped nozzle was also tested which was less suitable because it caused droplets of water to be projected into the air which would then land back onto the disc 220.

The invention claimed is:

1. An imaging system for an autonomous vehicle, the imaging system comprising:
   a camera for capturing images within a first field of view;
   a transparent disc arranged in front of the camera such that the transparent disc covers the field of view of the camera;
   an actuator configured to rotate the transparent disc; and
   wherein the camera, the transparent disc and the actuator are configured to mount on an autonomous vehicle, and
   wherein the actuator is controlled to rotate the transparent disc in response to an accuracy level of an image processing algorithm falling below a threshold value.

2. An imaging system according to claim 1, wherein the camera is configured to mount on the autonomous vehicle with the camera facing a direction of movement of the autonomous vehicle.

3. An imaging system according to claim 1, wherein the images are fed to an image processor on board or off board the autonomous vehicle, the image processor being configured to apply the image processing algorithm to the images.

4. An imaging system according to claim 1, wherein the actuator is controlled to rotate the respective transparent disc in response to input from a sensor.

5. An imaging system according to claim 4, wherein the sensor is a precipitation sensor.

6. An imaging system according to claim 1, comprising at least one fluid dispenser for spraying a fluid onto the transparent disc.

7. An imaging system according to claim 6, wherein the fluid is air or water.

8. An imaging system according to claim 1, wherein the transparent disc is coated with a hydrophobic, super-hydrophobic, or hydrophilic surface treatment.

9. An imaging system according to claim 1, further comprising:
   a fluid dispenser constructed and arranged to spray a fluid onto the transparent disc within the first field of view.

10. An imaging system according to claim 9, wherein the transparent disc is a lens of the camera.

11. An imaging system according to claim 9, wherein the transparent disc is separate from a lens of the camera and located in front of the lens of the camera.

12. An imaging system according to claim 9, wherein the camera is a first camera and the images are first images, the imaging system further comprising a second camera for capturing second images within a second field of view, wherein the first images and the second images are fed to an image processor configured to apply the image processing algorithm to the first and second images.

13. An imaging system according to claim 12, wherein the transparent disc is a first transparent disc and the fluid dispenser is a first fluid dispenser, wherein the second camera is configured to capture the second images through a second transparent disc; and wherein the imaging system further comprises: a second fluid dispenser constructed and arranged to spray a fluid onto the second transparent disc within the second field of view; wherein the second camera and the second fluid dispenser are configured to mount on the autonomous vehicle.

14. An imaging system according to claim 13, wherein the first and second fluids are the same fluid.

15. An imaging system according to claim 13, wherein the first and second fluids are different fluids.

16. An image capture system for an autonomous vehicle, the imaging system comprising:
- a first camera for capturing first images within a first field of view;
- a first transparent disc arranged in front of the first camera such that the first transparent disc covers the first field of view;
- a first actuator configured to rotate the first transparent disc;
- a second camera for capturing second images within a second field of view;
- a second camera disc arranged in front of the second camera such that the second transparent disc covers the second field of view;
- a second actuator configured to rotate the second transparent disc;
- wherein the first camera and second camera are configured to mount on the autonomous vehicle to capture the first and second images in the same plane of view; and
- an image processor configured to apply an image processing algorithm to the first and second images,
- wherein the first and second actuators are controlled to rotate the first and second transparent discs, respectively, in response to an accuracy level of the image processing algorithm falling below a threshold value.

* * * * *